United States Patent [19]

Uesugi

[11] 4,273,423
[45] Jun. 16, 1981

[54] ZOOM LENS BARREL ASSEMBLY FOR CONSTANT MAGNIFICATION

[75] Inventor: Kyozo Uesugi, Sakai, Japan

[73] Assignee: Minolta Camera Kabushiki Kaisha, Osaka, Japan

[21] Appl. No.: 85,527

[22] Filed: Oct. 17, 1979

[30] Foreign Application Priority Data

Nov. 4, 1978 [JP] Japan .................. 53-136133

[51] Int. Cl.³ .............................. G02B 15/18
[52] U.S. Cl. .................. 350/429; 352/91 R
[58] Field of Search ........... 350/187; 352/86, 91 R

[56] References Cited

U.S. PATENT DOCUMENTS

| 4,083,057 | 4/1978 | Quinn | 350/187 |
| 4,193,667 | 3/1980 | Yasukuni | 350/187 |

Primary Examiner—Conrad J. Clark

Attorney, Agent, or Firm—Jackson, Jones & Price

[57] ABSTRACT

A zoom lens barrel is constructed such that the axial movement and rotation of a single operation ring relative to a stationary barrel causes zooming and focusing respectively and provides a device for providing constant magnification photography. This is accomplished by a plurality of cam grooves provided on one of the operation ring and the stationary barrel and a guide pin provided on the other of the operation ring and the stationary barrel and releasably engageable with each of the cam grooves. Each of the cam grooves forces the operation ring to rotate upon axial movement of the operation ring through the engagement with the guide pin such that magnification remains constant during focusing. The magnification that remains constant during focusing varies depending on which of the cam grooves the guide pin is engaged with.

10 Claims, 6 Drawing Figures

ZOOM LENS BARREL ASSEMBLY FOR CONSTANT MAGNIFICATION

BACKGROUND OF THE INVENTION

1. Field of the Invention

The present invention relates to a zoom lens assembly having a lens barrel capable of focusing and zooming through a single operating ring, and more particularly to a device for repetitive constant magnification photography using an improved zoom lens barrel.

2. Description of the Prior Art

Constant magnification photography may be achieved by adjusting the focus of the lens system in response to the change in the object distance and also by adjusting the focal length to correct for the change in magnification due to the change in the object distance. In the prior art, it is known to connect the zooming ring to the focusing ring in a predetermined manner so that a zooming operation, to off-set the change in magnification, may also automatically accompany the focusing operation to focus the system on a moving object.

Prior art devices for constant magnification photography can be broadly divided into two types. One type interlocks a focusing ring and a zooming ring of a zoom lens barrel with a correcting cam externally mounted on the zoom lens barrel to provide for relative rotation at a predetermined speed ratio. The other type electrically controls the rotating speed ratio of the focusing ring and the zooming ring. Both types utilize a zoom lens barrel which includes separate operating rings for focusing and zooming.

Japanese Patent Publication No. Sho 51-27577 published on Aug. 13, 1976 discloses a relatively compact zoom lens barrel capable of constant magnification photography. Cam grooves are disclosed for interconnecting a focusing operation ring with a zooming operation ring to provide constant magnification photography. This disclosure is not applicable to a zoom lens barrel having a single operational ring for both zooming and focusing.

Japanese Patent Laid Open Publication No. Sho 52-28875 published on March 15, 1977 discloses an electrical device for driving a zoom lens barrel of a single ring type to provide constant magnification photography. U.S. Pat. No. 4,083,057 and the Swiss Pat. No. 481,389 published on Dec. 31, 1969 are cited of general interest.

Achieving the advantages of constant magnification in a zoom lens system with a relatively simplified zoom lens barrel is still a goal sought to be achieved by the prior art particularly for application in 35 mm single lens reflex cameras.

SUMMARY OF THE INVENTION

A prime object of the present invention is to provide a simply constructed device for constant magnification photography using a zoom lens barrel which permits both focusing and zooming by means of a single operating ring, further characterized in the provision of a cam groove for providing a predetermined constant magnification. The cam groove is positioned on either a stationary or fixed barrel or a single operating ring with a complimentary pin for fitting into the cam provided on the other member.

Constant magnification photography can, accordingly, be achieved with the simple addition of only a cam and a guide pin to a single operating ring type zoom lens barrel. Since the invention is extremely simple in construction, it is advantageous in that it not only facilitates production with reduced costs, but also results in a minor change in size from the original zoom lens barrel.

The above and other objects and features of the present invention will become more apparent from the following description taken in connection with the accompanying drawings.

DESCRIPTION OF THE PREFERRED EMBODIMENTS

The following description is provided to enable any person skilled in the optical art to make and use the invention and sets forth the best modes contemplated by the inventor of carrying out his invention. Various modifications, however, will remain readily apparent to those skilled in the art since the generic principles of the present invention have been defined herein specifically to provide a simplified constant magnification zoom system that utilizes a single operational ring.

With reference to FIGS. 1 through 5, which show a first embodiment of the present invention, a zoom lens barrel 1 is disclosed capable of both a focusing and zooming mode of operation by means of a single operating ring 2 which is relatively rotatable about and axially movable along the barrel 1.

Figure 3:
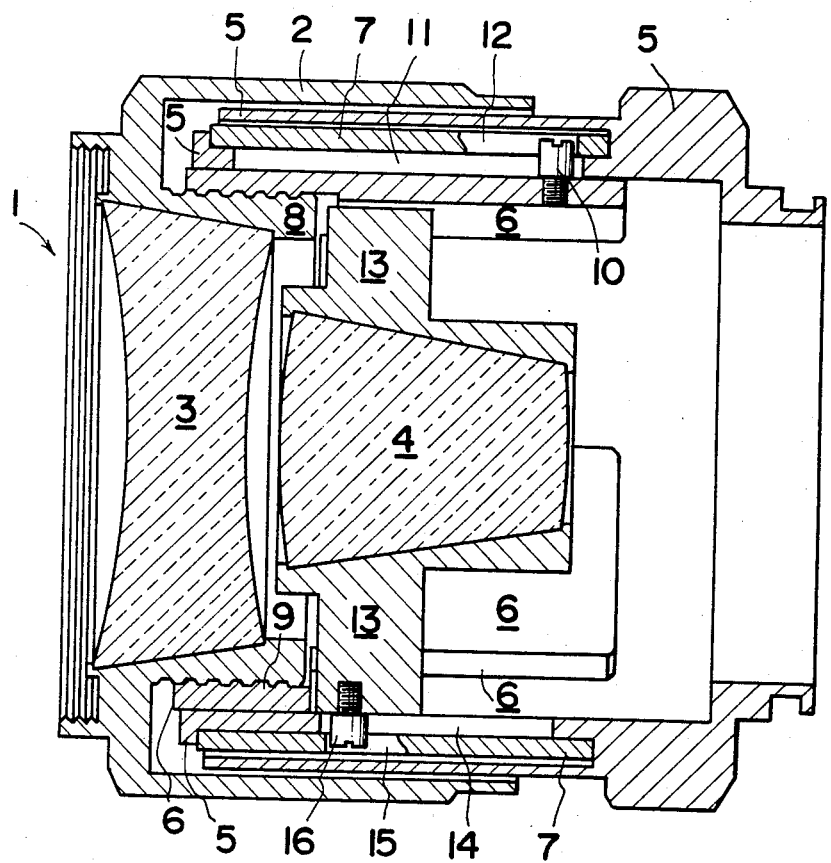
FIG. 3 is a schematic cross-sectional view illustrating an internal construction of the zoom lens barrel.

FIG. 3 discloses the internal construction of the zoom lens barrel 1 wherein a first lens group 3 is used for both focusing and zooming and a second lens group 4 is used only for zooming. It should be appreciated that a plurality of lens elements can collectively form each respective lens group. A stationary or fixed barrel member 5 can be mounted onto a camera body (not shown) with a first movable frame 6 movably mounted in a cam ring 7. A first lens group holder 8 is provided integrally with operating ring 2 and is fitted by a helicold thread 9 into the first movable frame 6. A cam pin 10, carried by the first movable holder 6, is complimentarily fitted into an axial groove 11 formed on stationary barrel 5 and further into a cam groove 12 formed on the cam ring 7. This arrangement permits the rotation of cam ring 7 in response to any axial movement of the first movable frame 6. A second movable frame 13 serves as a holder of the second lens group 4 and a second movable frame 13 carries cam pin 16 which in turn fits into an axial groove 14 formed on the stationary barrel 5 as well as into cam groove 15 formed on cam ring 7.

With the above zoom lens barrel, the first lens group holder 8 is moved during rotation in an axial direction by helicoid thread 9 by operating ring 2 whereby a focusing mode of operation is performed. When operating ring 2 is axially moved forward without rotation, the first movable frame 6 is moved straightforward through its connection with the helicoid thread 9 in an axial direction integrally with the first lens group holder 8. This movement causes the cam pin 10 to contact and rotate the cam ring 7 through the cam groove 12 as it travels along the axial groove 11.

The rotation of cam ring 7 further causes the second movable frame 13 to move straightforward in an axial direction by means of cam pin 16, axial groove 14 and cam groove 15, whereby a zooming mode of operation is performed.

Figure 1:
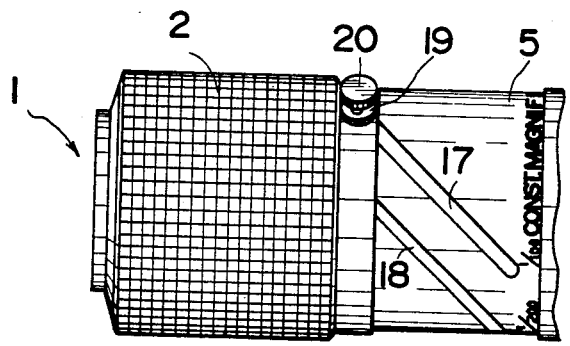
FIGS. 1 and 2 disclose side views of a zoom lens barrel providing constant magnification photography according to an embodiment of the present invention.
Figure 2:
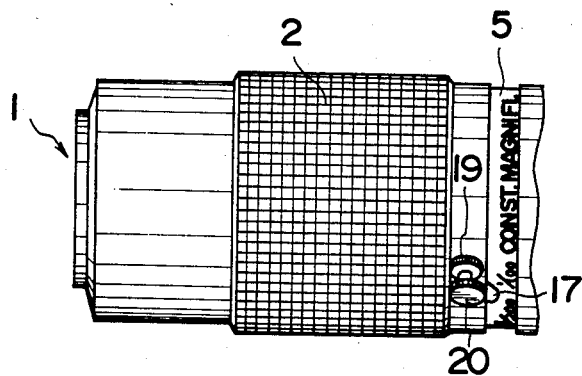
Figure 4:
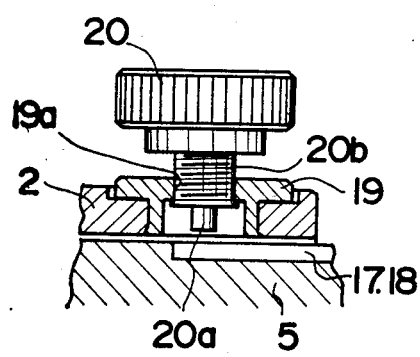
FIGS. 4 and 5 are partial cross-sectional views of mounting cam pins for constant magnification photography according to the present invention.
Figure 5:
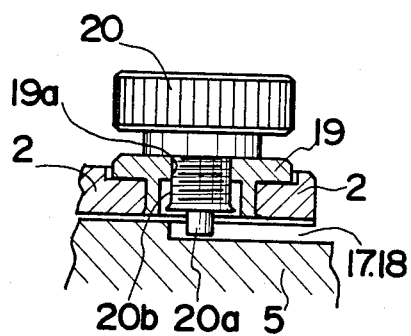

In the zoom lens barrel housing member with the above construction, two cam grooves 17 and 18 are formed on the outer peripheral surface of the stationary barrel 5, as shown in FIG. 1, and an operating knob 20 carrying a guide pin or cam pin member 20a engageable with cam groove 17 or 18 is mounted on operating ring 2 by mounting bracket 19. As shown in FIGS. 4 and 5, mounting bracket 19 is fitted integrally with operating ring 2, and formed on mounting bracket 19 is a female thread bore 19a into which a male threaded shaft 20b of operating knob 20 fits. Rotation of the knob 20 causes guide pin 20a at the tip of operating knob 20 to engage a preselected cam groove 17 or 18.

As shown in FIG. 5, when guide pin 20a of operating knob 20 is engaged with either cam groove 17 or 18, operating ring 2 can only be moved as determined by the shape of cam groove 17 or 18. In the above embodiment, cam grooves 17 and 18 are appropriately configured so that when a focal length of the optical system is assumed as f, and a distance from the front focal point of the optical system to an object is x, then $f/x = 1/100$ and $f/x = 1/200$ may be represented by the respective grooves. Therefore, when operating ring 2 is moved as predetermined by cam grooves 17 or 18, the first lens group holder 8 and second movable frame 13 are moved at a speed providing a constant magnification of 1/100 or 1/200, to enable constant magnification photography.

However, when operating knob 20 is untightened, and guide pin 20a is retracted from cam groove 17 and 18, as shown in FIG. 4, a normal focusing and zooming mode of operation as described above are possible.

Figure 6:
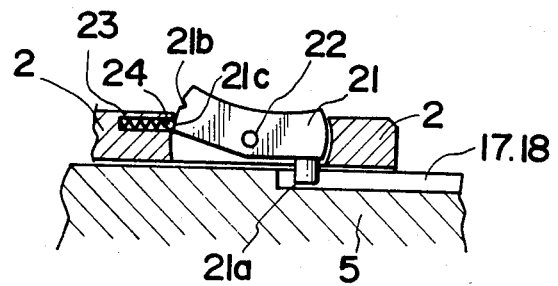
FIG. 6 is a cross-sectional view illustrating a further modified cam pin arrangement for constant magnification photography according to another embodiment of the present invention.

FIG. 6 shows an alternative embodiment of the present invention with a locking detent assembly. An operating button or lever 21 supports a lower guide pin 21a which is engageable with either cam groove 17 or 18. The operating lever is rotatably supported by a shift 22 provided on operating ring 2. The operating button 22 can be further click-stopped by a locking ball 24 which is biased by a compressed spring 23 at selected positions where locking ball 24 fits into a detent portion 21b and a detent portion 21c. The guide pin 21a can engage cam groove 17 or 18 at that position when locking ball 24 fits into the detent portion 21c, whereby constant magnification photography is possible.

While the above described embodiments of the present invention are shown in the drawings, the present invention is not limited to such embodiments alone.

The internal construction of a zoom lens barrel shown in FIG. 3 is just one example, and the present invention is actually applicable to all zoom lens barrels which are capable of both focusing and zooming by means of a single operating ring. It is further optional for the cam groove and the guide pin to be provided on either a stationary barrel or the operating ring, with the cam on either one and the guide pin on the other.

Furthermore, when the constant magnification required for photography need not be completely constant, then the shape of the cam groove may be modified accordingly.

In addition, some single operating ring type zoom lens barrels have a ring marked with a camera-to-subject distance scale provided between an operating ring and a stationary barrel. In such a construction, there may be provided an escape hole on the operating ring so that guide pins 20b and 21a pass through the hole.

When the degree of constant magnification may be approximate, as described above, it is possible to construct a device with one cam groove used for enabling two types of constant magnification photography. In this case, two guide pins are provided at circumferentially different positions so that one of the pins may be removed while the other is used.

While the above embodiments have been disclosed as the best mode presently contemplated by the inventor, it should be realized that these examples should not be interpreted as limiting, because artisans skilled in this field, once given the present teachings, can vary from these specific embodiments.

Accordingly, the scope of the present invention should be determined solely from the following claims in which I claim:

1. In a zoom lens barrel which includes a stationary barrel and a single operation ring, axial movement of which relative to said stationary barrel causes zooming operation and rotation of which relative to said stationary barrel causes focusing operation, a device for constant magnification photography comprises:
   cam means provided on one of said operation ring and said stationary barrel, and
   a guide pin provided on the other of said operation ring and said stationary barrel and engageable with said cam means, said cam means having a configuration by which said cam means forces said operation ring to rotate upon axial movement of the operation ring through the engagement with said guide pin such that a magnification remains substantially constant during focusing for the varying distance to a focused object.

2. A device for constant magnification photography as defined in claim 1, wherein said guide pin is releasably engageable with said cam means.

3. A device for constant magnification photography as defined in claim 2, wherein said cam means includes a plurality of cam grooves each of which said guide pin is releasably engageable with, configurations of said cam grooves being different from each other such that the particular magnification ratio that remains substantially constant during focusing for a varying distance to a focused object will vary depending on which of said grooves said guide pin is engaged with.

4. A device for constant magnification photography as defined in claim 1, wherein said operation ring is axially movably and rotatably fit on the outer periphery of said stationary barrel.

5. A device for constant magnification photography as defined in claim 2 wherein said operation ring is axially movably and rotatably fit on the outer periphery of said stationary barrel.

6. A device for constant magnification photography as defined in claim 3 wherein said operation ring is axially movably and rotatably fit on the outer periphery of said stationary barrel.

7. In a zoom lens barrel which includes a statonary barrel and a single operation ring, axial movement of which relative to said stationary barrel causes zooming operation of the lens and rotation of which relative to said stationary barrel causes focusing operation of the lens, a device for constant magnification photography comprises:

cam means provided on one of said operation ring and said stationary barrel, and a guide pin provided on the other of said operation ring and said stationary barrel and engageable with said cam means, said cam means having a configuration by which said cam means controls said operation ring to perform a combined axial and rotational movement along a given locus for changing the focus, maintaining the image magnification constant.

8. An improved zoom lens system for providing a preselected plurality of constant magnification ratios comprising:

a lens barrel housing member a pair of relatively movable lens groups for providing a focusing and a zooming mode of operation mounted in the housing member;

a relatively rotatable and axially movable focusing and zooming ring member mounted on the housing member and operatively connected to the lens groups whereby focusing is accomplished during rotation of the ring member about the lens barrel and zooming is accomplished by movement of the ring member along the lens barrel;

at least a pair of cam grooves provided on one of the lens barrel and ring member;

a cam pin member provided on the other of the lens barrel and ring member, each respective cam groove providing a predetermined constant magnification ratio during a zooming mode of operation when engaging the cam pin member, and means for releasably locking the cam pin member into engagement with either cam groove at the option of the operator.

9. The invention of claim 8 wherein the means for locking the cam pin member includes a rotatably mounted knob, appropriate rotation of the knob extends the cam pin into or out of engagement with a preselected cam groove.

10. The invention of claim 8 wherein the means for locking the cam pin member includes a lever pivotally mounted on the ring member, one end of the lever supporting the cam pin member for engagement with a preselected cam groove on the outer peripheral surface of the lens barrel housing member, the other end of the lever supporting a detent assembly capable of providing a pair of positive lock positions for engagement and non-engagement of the cam pin member with a cam groove.

* * * * *